(12) United States Patent
Totani

(10) Patent No.: US 8,535,040 B2
(45) Date of Patent: Sep. 17, 2013

(54) PLASTIC FILM STRETCHING APPARATUS

(75) Inventor: Mikio Totani, Kyoto (JP)

(73) Assignee: Totani Corporation, Kyoto (JP)

( * ) Notice: Subject to any disclaimer, the term of this patent is extended or adjusted under 35 U.S.C. 154(b) by 413 days.

(21) Appl. No.: 12/989,711

(22) PCT Filed: Jul. 13, 2009

(86) PCT No.: PCT/JP2009/062692
§ 371 (c)(1),
(2), (4) Date: Oct. 26, 2010

(87) PCT Pub. No.: WO2010/005102
PCT Pub. Date: Jan. 14, 2010

(65) Prior Publication Data
US 2011/0091595 A1    Apr. 21, 2011

(30) Foreign Application Priority Data
Jul. 11, 2008    (JP) .................. 2008-181094

(51) Int. Cl.
B29C 55/18    (2006.01)
(52) U.S. Cl.
USPC .......................... 425/367; 425/374

(58) Field of Classification Search
USPC .......................... 425/66, 367, 373, 374, 328
See application file for complete search history.

(56) References Cited

U.S. PATENT DOCUMENTS
3,948,709 A * 4/1976 Ida et al. ............... 156/209
2002/0089087 A1 * 7/2002 Mushaben ............. 264/288.4

FOREIGN PATENT DOCUMENTS
| JP | 62017777 | 1/1987 |
| JP | 2000016417 | 1/2000 |
| JP | 2003048260 | 2/2003 |
| JP | 2005001114 | 1/2005 |

* cited by examiner

Primary Examiner — Ryan Ochylski
(74) Attorney, Agent, or Firm — Kirschstein, et al.

(57) ABSTRACT

A plastic film (2) is drawn in a different manner. A plurality of rollers (15a, 15b, 15c) are opposed to a base (14). The rollers are operated by a first drive mechanism (22), and the rollers are moved in the lateral direction of the plastic film. Second drive mechanisms (17a, 17b, 17c) act on the rollers, respectively. On the base, at least one roller is pressed against the plastic film, and at least one roller rolls along the plastic film. The plastic film is drawn by that roller.

14 Claims, 8 Drawing Sheets

PLASTIC FILM STRETCHING APPARATUS

TECHNICAL FIELD

The invention relates to an apparatus for stretching a plastic film longitudinally thereof.

BACKGROUND

There has heretofore been proposed an apparatus for stretching a plastic film longitudinally thereof to correct a pitch at which a pattern is printed on the plastic film repeatedly, as disclosed in Japanese Laid-Open Patent Publication No. 48260 of 2003.

The apparatus includes heating means for heating and stretching the plastic film. However, the plastic film is not always suitable for heating and stretching. In this connection, it is desired to stretch the plastic film in a way different from the apparatus.

It is therefore an object of the invention to provide an apparatus for stretching a plastic film longitudinally thereof in a way different from the prior art.

SUMMARY OF THE INVENTION

According to the invention, the apparatus includes a base and plastic film feeding means by which the plastic film is directed onto the base and fed longitudinally thereof and intermittently. The apparatus further includes a plurality of rollers supported on shaft means for rotation thereabout, the shaft means extending longitudinally of the plastic film, the rollers being opposed to the base. The apparatus further includes first drive means by which the rollers are moved widthwise of the plastic film when the plastic film is stopped temporarily. The apparatus further includes second drive means working on the rollers individually so that at least one of the rollers can be pressed against the plastic film on the base when the plastic film is stopped temporarily, at least one of the rollers being rolled along the plastic film to stretch the plastic film.

In a preferred embodiment, the rollers are moved by the first drive means so that at least one of the rollers can be rolled along the plastic film when the rollers are moved.

At least one of the rollers may be rotated by the first drive means to be rolled along the plastic film when being pressed against the plastic film whereby the rollers can be moved widthwise of the plastic film.

The rollers are arranged widthwise of the plastic film.

The second drive means comprises a plurality of linear actuators supported on a carriage. The linear actuators are connected to the rollers respectively. The carriage is moved along a beam extending widthwise of the plastic film. The first drive means is connected to the carriage so that the carriage, the linear actuators and the rollers can be moved by the first drive means. The linear actuators work on the rollers individually so that at least one of the rollers can be pressed against the plastic film.

First and second positions are predetermined on opposite sides of the plastic film widthwise thereof. The rollers stand by at the first position to be moved to the second position through the plastic film when the plastic film is stopped temporarily. The rollers then stand by at the second position to be moved to the first position through the plastic film when the plastic film is stopped temporarily.

At least one of the rollers is pressed against the base to stand by as it is at the first or second position. At least one of the rollers then steps on the plastic film to be pressed against the plastic film when the rollers are moved.

The rollers may be spaced from the base to stand by as it is at the first or second position. At least one of the rollers is then pressed against the plastic film when reaching the plastic film in accordance with the movement of rollers.

Each of the rollers includes a tapered peripheral edge which bites into the plastic film to stretch the plastic film when the roller is pressed against the plastic film and rolled along the plastic film.

The peripheral edge has an arced section of a radius.

In addition, each of the rollers includes a cylindrical outer surface and an annular protrusion extending beyond and protruding from the outer surface. The peripheral edge is formed by the annular protrusion. The outer surface is engaged with the plastic film on opposite sides of the annular protrusion axially of the roller when the roller is pressed against the plastic film.

The rollers may include the peripheral edges biting into the plastic film at amounts different from roller to roller.

The rollers may include the peripheral edges having the radii different from roller to roller.

The rollers may include the peripheral edges disposed at positions different from roller to roller axially of the rollers.

BEST MODE TO CARRY OUT THE INVENTION

Figure 1:
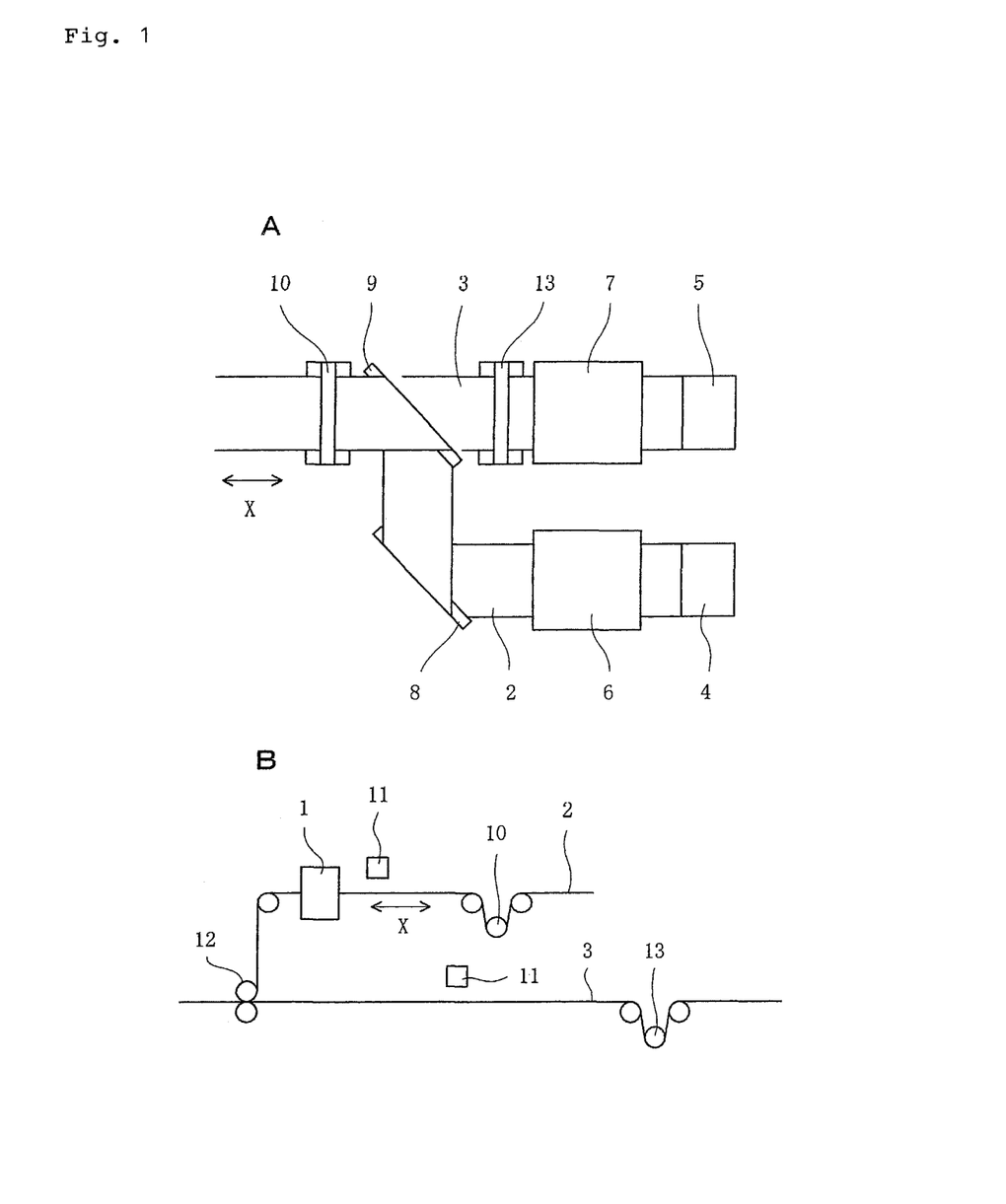
FIG. 1 is a plan view (A) and a side view (B) of a preferred embodiment of the invention.

Turning now to the drawings, FIG. 1 illustrates an apparatus 1 according to the invention. In the embodiment, the apparatus 1 is incorporated into an installation for successively making plastic bags in which two plastic films 2 and 3 are supplied from rolls 4 and 5 and accumulated in accumulators 6 and 7. One of the plastic films 2 is then directed to turn bars 8 and 9 to be changed in direction and disposed on the upper side of the other plastic film 3. In addition, one of the plastic films 2 is directed to a dancer roller 10, a mark sensor 11, the apparatus 1 and feed rollers 12 while the other plastic film 3 is directed to a dancer roller 13, a mark sensor 11 and the feed rollers 12. The plastic films 2 and 3 are superposed on each other when being directed to the feed rollers 12. The apparatus 1 is arranged to stretch the plastic film 2 longitudinally thereof.

The feed rollers 12 are rotated by a drive motor so that the plastic films 2 and 3 can be fed longitudinally thereof and intermittently and stopped temporarily. The plastic film 2 and 3 are fed in a direction X which is horizontal. In addition, the plastic films 2 and 3 are heat sealed with each other by heat seal means and then cut by a cutter when being stopped temporarily to successively make plastic bags, as in the case of the installation of Japanese Laid-Open Patent Publication No. 48260 of 2003.

In the embodiment, the dancer rollers 10 and 13 give the plastic films 2 and 3 tensions. Each of the plastic films 2 and 3 has a pattern printed thereon and a mark placed thereon repeatedly at a pitch. The mark sensors 11 detect the marks of plastic films 2 and 3 to generate signals. The apparatus 1 stretches one of the plastic films 2 longitudinally thereof or in the direction X in response to the signals to correct the pitch at which the pattern is printed on the plastic film 2 repeatedly, resulting in no discrepancy in pattern between the plastic films 2 and 3.

Figure 2:
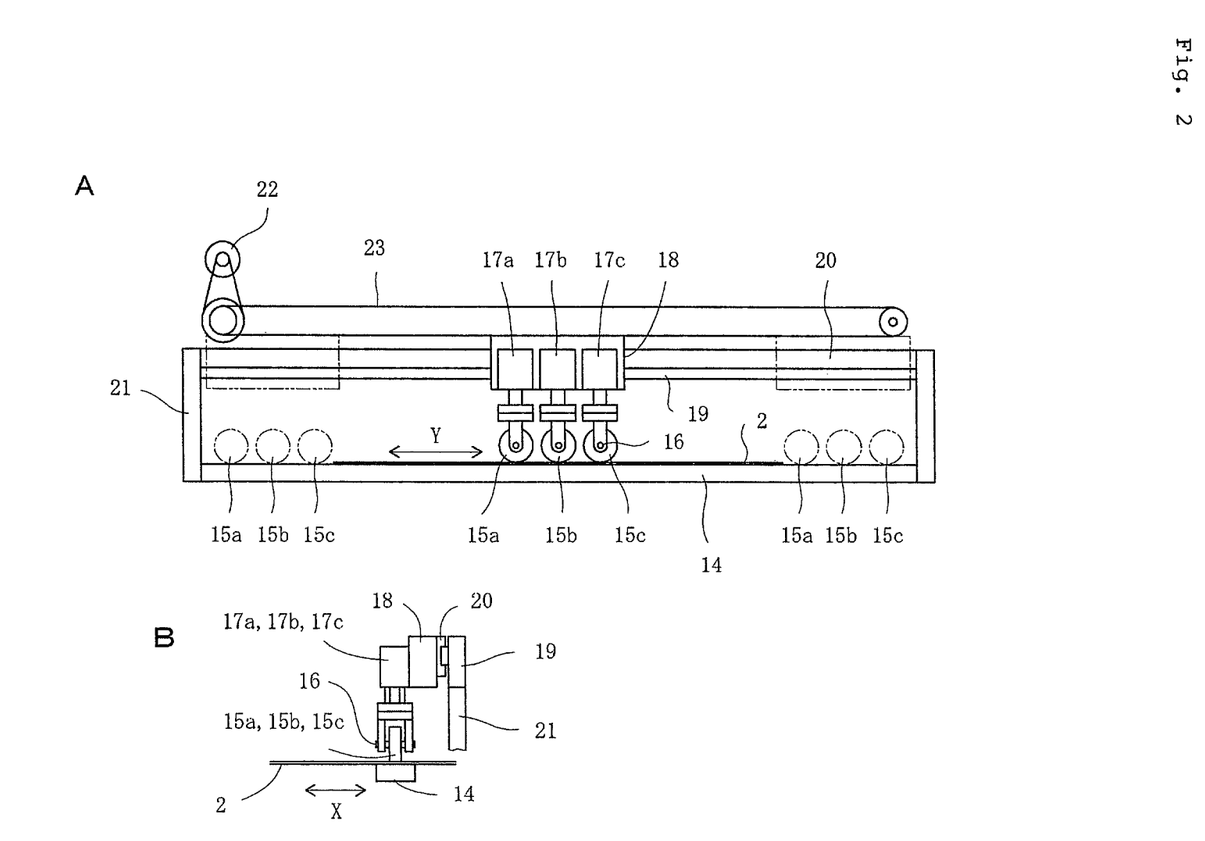
FIG. 2 is an elevational view (A) and a side view (B) of the apparatus of FIG. 1.

In the meantime, the apparatus 1 includes a base 14 comprising a flat plate and extending horizontally, as shown in FIG. 2. In addition, the apparatus 1 includes plastic film feeding means by which the plastic film 2 is directed onto the base 14 and fed longitudinally thereof and intermittently. In the embodiment, the plastic film feeding means comprises the feed rollers 12. The plastic film 2 is therefore directed onto the base 14 and fed longitudinally thereof and intermittently by the feed rollers 12. The plastic film 2 is disposed on the upper side of the base 14 to be fed along the upper surface thereof when being directed onto the base 14. The base 14 is made of metal. In the embodiment, the base 14 is made of stainless steel and heat-treated.

The apparatus 1 further includes a plurality of rollers 15a, 15b and 15c supported on shaft means 16 for rotation thereabout, the shaft means 16 extending longitudinally of the plastic film 2 or in the direction X, the rollers 15a, 15b and 15c being opposed to the base 14. The rollers 15a, 15b and 15c are disposed on the upper side of the base 14 to be opposed to the upper surface thereof. The rollers 15a, 15b and 15c are arranged widthwise of the plastic film 2 or in a direction Y. In this connection, the shaft means 16 comprises shafts extending longitudinally of the plastic film 2 and arranged widthwise thereof. The rollers 15a, 15b and 15c are supported on the shafts 16 for rotation thereabout respectively. The rollers 15a, 15b and 15c are also made of metal. In the embodiment, the rollers 15a, 15b and 15c are made of tool steel and surface-treated.

The apparatus 1 further includes first drive means by which the rollers 15a, 15b and 15c are moved widthwise of the plastic film 2 or in the direction Y when the plastic film 2 is stopped temporarily. The apparatus 1 further includes second drive means working on the rollers 15a, 15b and 15c individually so that at least one of the rollers 15a, 15b and 15c can be pressed against the plastic film 2 on the base 14 when the plastic film 2 is stopped temporarily. At least one of the rollers 15a, 15b and 15c is therefore rolled along the plastic film 2 when the rollers 15a, 15b and 15c are moved, to stretch the plastic film 2.

The second drive means comprises a plurality of linear actuators or linear slides 17a, 17b and 17c mounted and supported on a carriage 18. The linear slides 17a, 17b and 17c are disposed on the upper side of the base 14. In addition, the linear slides 17a, 17b and 17c extend downwardly and include connecting members on which the shafts 16 are mounted and supported. It should therefore be understood that the linear slides 17a, 17b and 17c are connected to the rollers 15a, 15b and 15c respectively.

The carriage 18 is mounted and supported on a beam 19 and guided by a linear guide 20 to be moved along the beam 19. The beam 19 and the linear guide 20 extend widthwise of the plastic film 2 or in the direction Y to be fixed to a pillar 21. The first drive means comprises a motor 22 connected to the carriage 18 through a timing belt 23 fixed to the carriage 18. The timing belt 23 also extends widthwise of the plastic film 2.

The carriage 18, the linear slides 17a, 17b and 17c and the rollers 15a, 15b and 15c are therefore moved widthwise of the plastic film 2 or in the direction Y, by the motor 22 and the timing belt 23. In addition, the linear slides 17a, 17b and 17c work on the rollers 15a, 15b and 15c individually, each of the rollers 15a, 15b and 15c being pushed and moved downwardly or pulled and moved upwardly by each of the linear slides 17a, 17b and 17c. At least one of the rollers 15a, 15b and 15c can therefore be pressed against the plastic film 2 on the base 14 to be rolled along the plastic film 2 when the rollers 15a, 15b and 15c are moved.

Accordingly, the rollers 15a, 15b and 15c compress and deform the plastic film 2 when being pressed against the plastic film 2 and rolled along the plastic film 2, to stretch the plastic film 2 longitudinally thereof. The apparatus can therefore stretch the plastic film 2 longitudinally thereof without heating the plastic film 2, unlike the apparatus of Japanese Laid-Open Patent Publication No. 48260 of 2003.

In addition, only one of the rollers 15a, 15b or 15c can be pressed against the plastic film 2 and rolled along the plastic film 2 to stretch the plastic film 2 at an amount. Two of the rollers 15a, 15b or 15c can also be pressed against the plastic film 2 and rolled along the plastic film 2. All the rollers 15a, 15b and 15c can also be pressed against the plastic film 2 and rolled along the plastic film 2. The apparatus can therefore adjust the amount of stretching the plastic film 2.

In the embodiment, first and second positions are predetermined on opposite sides of the plastic film 2 widthwise thereof. The rollers 15a, 15b and 15c stand by at the first position to be moved to the second position through the plastic film 2 when the plastic film 2 is stopped temporarily. The rollers 15a, 15b and 15c then stand by at the second position to be moved to the first position through the plastic film 2 when the plastic film 2 is stopped temporarily, and so on.

In addition, at least one of the rollers 15a, 15b and 15c is pressed against the base 14 to stand by as it is at the first or second position. At least one of the rollers 15a, 15b and 15c then steps on the plastic film 2 to be pressed against the plastic film 2 when the rollers 15a, 15b and 15c are moved. For example, only one of the rollers 15a, 15b or 15c is pressed against the base 14 to stand by as it is. That roller 15a, 15b or 15c then steps on the plastic film 2 to be pressed against the plastic film 2. Two of the rollers 15a, 15b or 15c may be pressed against the base 14 to stand by as it is. Those rollers 15a, 15c or 15c then step on the plastic film 2 to be pressed against the plastic film 2. All the rollers 15a, 15b and 15c may be pressed against the base 14 to stand by as it is. Those rollers 15a, 15b and 15c then step on the plastic film 2 to be pressed against the plastic film 2.

The apparatus can therefore stretch the plastic film 2 uniformly throughout the width thereof.

The rollers 15a, 15b and 15c may be spaced from the base 14 to stand by as it is at the first or second position. In this case, at least one of the rollers 15a, 15b and 15c is then pressed against the plastic film 2 when reaching the plastic film 2 in accordance with the movement of rollers 15a, 15b and 15c. The linear slides 17a, 17b and 17c may be driven by turns so that the rollers 15a, 15b and 15c can be pushed and moved downwardly by turns to be pressed against the plastic film 2 when reaching the plastic film 2 in accordance with the movement of rollers 15a, 15b and 15c. The linear slides 17a, 17b and 17c may be driven simultaneously with each other so that the rollers 15a, 15b and 15c can be pushed and moved downwardly simultaneously with each other when the foremost roller reaches the plastic film 2.

The rollers 15a, 15b and 15c may start to be moved widthwise of the plastic film 2 at the first or second position just before the plastic film 2 is stopped temporarily so that at least one of the rollers 15a, 15b and 15c can be pressed against the plastic film 2 when the plastic film 2 is stopped temporarily.

Figure 3:
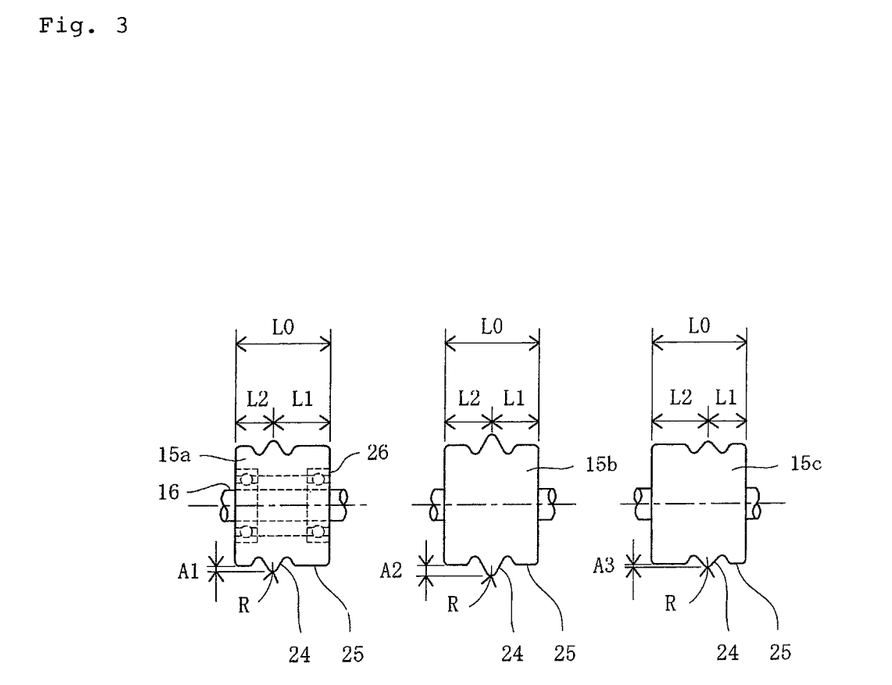
FIG. 3 is an explanatory view of the rollers of FIG. 2.

Each of the rollers 15a, 15b and 15c includes a tapered peripheral edge 24, as shown in FIG. 3, which bites into the plastic film 2 to stretch the plastic film 2 when the roller is pressed against the plastic film 2 and rolled along the plastic film 2.

The peripheral edge 24 has an arced section of a radius R. For example, the radius R is of 0.5 to 5 mm.

A groove is therefore formed in the plastic film 2 by the peripheral edge 24 biting into the plastic film 2, stretching the plastic film 2 effectively.

In addition, each of the rollers 15a, 15b and 15c includes a cylindrical outer surface 25 and an annular protrusion extending beyond and protruding from the outer surface 25. The annular protrusion protrudes from the outer surface 25 at an amount A1, A2 or A3 which is less than the thickness of the plastic film 2. The peripheral edge 24 is formed by the annular protrusion. The outer surface 25 is engaged with the plastic film 2 on opposite sides of the annular protrusion axially of the roller 15a, 15b or 15c when the roller 15a, 15b or 15c is pressed against the plastic film 2.

By the way, each of the rollers 15a, 15b and 15c is provided with bearings 26. The roller 15a, 15b or 15c is guided by the bearings 26 to be rotated about the shaft 16.

The outer surface 25 therefore constitutes a stop for keeping the peripheral edge 24 from biting into the plastic film 2 more deeply than the amount of protruding A1, A2 or A3. The peripheral edge 24 bites into the plastic film 2 at an amount dependent on the amount of protruding A1, A2 or A3. The apparatus can therefore predetermine the amount of stretching the plastic film 2 by predetermining the amount of protruding A1, A2 or A.

In addition, the amounts of protruding A1, A2 and A3 are different from roller to roller. The amount A2 is large one of 160 μm. The amount A3 is small one of 80 μm. The amount A1 is middle one of 120 μm. It should therefore be understood that the rollers 15a, 15b and 15c include the peripheral edges 24 biting into the plastic film 2 at amounts different from roller to roller.

The apparatus can therefore change the amount of stretching the plastic film 2 by selecting the roller 15a, 15b or 15c by the linear slide 17a, 17b or 17c. For example, the rollers 15a and 15c are pulled and moved upwardly by the linear slides 17a and 17c while the roller 15b is pushed and moved downwardly by the linear slide 17b so that the roller 15b can be pressed against the plastic film 2, increasing the amount of stretching the plastic film 2 dependently on the amount of protruding A2. The rollers 15a and 15b may be pulled and moved upwardly by the linear slides 17a and 17b while the roller 15c is pushed and moved downwardly by the linear slide 17c so that the roller 15c can be pressed against the plastic film 2, decreasing the amount of stretching the plastic film 2 dependently on the amount of protruding A3. The rollers 15b and 15c may be pulled and moved upwardly by the linear slides 17b and 17c while the roller 15a is pushed and moved downwardly by the linear slide 17a so that the roller 15a can be pressed against the plastic film 2, making the amount of stretching the plastic film 2 kept to be middle dependently on the amount of protruding A1.

The rollers 15a, 15b and 15c may include the peripheral edges 24 having the radii R different from roller to roller. This arrangement can also adjust the amount of stretching the plastic film 2. The peripheral edges 24 may have the same radius R as each other.

The rollers 15a, 15b and 15c are arranged widthwise of the plastic film 2 or in the direction Y, as described above. In addition, in the embodiment, the peripheral edges 24 are formed at positions different from each other axially of the rollers 15a, 15b and 15c. For example, the roller 15b includes the peripheral edge 24 formed at the center of roller to be spaced from the opposite ends of roller at distances L1 and L2, the distances L1 and L2 being equal to each other. The roller 15c includes the peripheral edge 24 formed near to one of the opposite ends of roller to be spaced from the opposite ends of roller at distances L1 and L2, the distance L1 being less than L2. The roller 15a includes the peripheral edge 24 formed near to the other end of roller to be spaced from the opposite ends of roller at distances L1 and L2, the distance L1 being greater than the distance L2. It should therefore be understood that the rollers 15a, 15b and 15c include the peripheral edges 24 disposed at positions different from roller to roller axially of the rollers 15a, 15b and 15c.

Furthermore, the distances L1 and L2 are predetermined so that the grooves can be formed in the plastic film 2 by the peripheral edges 24 of the rollers 15a and 15c not to be superposed on the groove formed in the plastic film 2 by the peripheral edge 24 of the roller 15b when the peripheral edges 24 bite into the plastic film 2.

The apparatus can therefore adjust the amount of stretching the plastic film 2 by making two of the rollers 15a and 15b, two of the rollers 15b and 15c or two of the rollers 15a and 15c pressed against the plastic film 2 to stretch the plastic film 2. The apparatus can further increase the amount of stretching the plastic film 2 by making all the rollers 15a, 15b and 15c pressed against the plastic film 2 to stretch the plastic film 2.

Accordingly, the apparatus can make the roller 15c pressed against the plastic film 2 to utilize the amount of protruding A3 which is small, make the roller 15a pressed against the plastic film 2 to utilize the amount of protruding A1 which is middle or make the roller 15b pressed against the plastic film 2 to utilize the amount of protruding A2 which is large, increasing the amount of stretching the plastic film 2 by turns. The apparatus can further make the rollers 15a and 15c pressed against the plastic film 2 to utilize the amounts of protruding A1 and A3, make the rollers 15b and 15c pressed against the plastic film 2 to utilize the amounts of protruding A2 and A3 or make the rollers 15a and 15b pressed against the plastic film 2 to utilize the amounts of protruding A1 and A2, increasing the amount of stretching the plastic film 2 by turns. The apparatus can further make the rollers 15a, 15b and 15c pressed against the plastic film 2 to utilize the amounts of protruding A1, A2 and A3. The apparatus can therefore adjust the amount of stretching the plastic film 2 in seven steps.

The peripheral edges 24 may be formed at the same position as each other axially of the rollers 15a, 15b and 15c. For example, the peripheral edges 24 may be formed at the center of roller. In this case, the apparatus should include spacers for adjusting the positions of the linear slides 17a, 17b and 17c so that the rollers 15a, 15b and 15c can include the peripheral edges 24 disposed at positions different from roller to roller axially of the rollers 15a, 15b and 15c.

Figure 4:
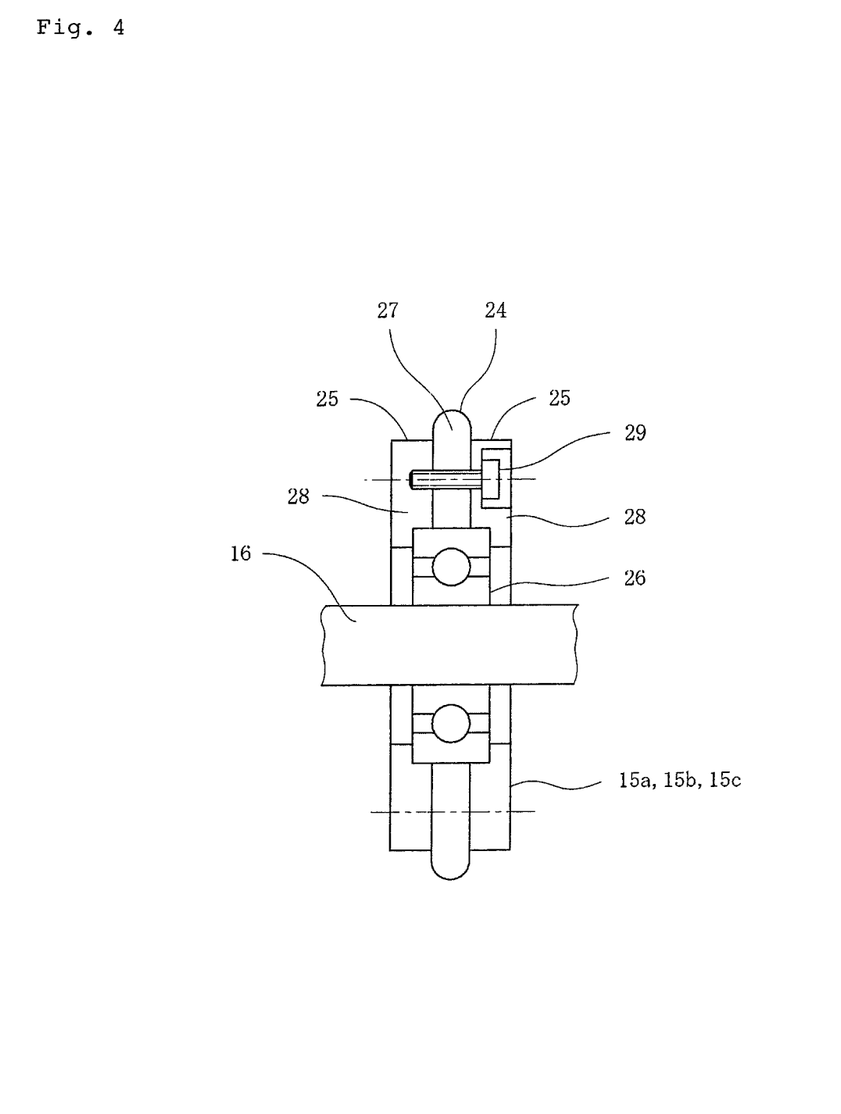
FIG. 4 is a sectional view of another embodiment.

The rollers 15a, 15b and 15c may be divided into three members 27 and 28 fixed to each other by fixing means such as bolts 29, as shown in FIG. 4. The peripheral edge 24 is formed on the center member 27 while the outer surface 25 is formed on other members 28. In this case, the central member 27 can be exchanged for new one by disassembling the members 27 and 28 when the peripheral edge 24 is abraded. Other members 28 can also be exchanged for new ones.

The linear slides 17a, 17b and 17c may be arranged to adjust amounts at which the rollers 15a, 15b and 15c are pushed and moved downwardly, to adjust amounts at which the peripheral edges 24 bite into the plastic film 2. The apparatus can therefore adjust the amount of stretching the plastic film 2 by the linear slides 17a, 17b and 17c.

Figure 5:
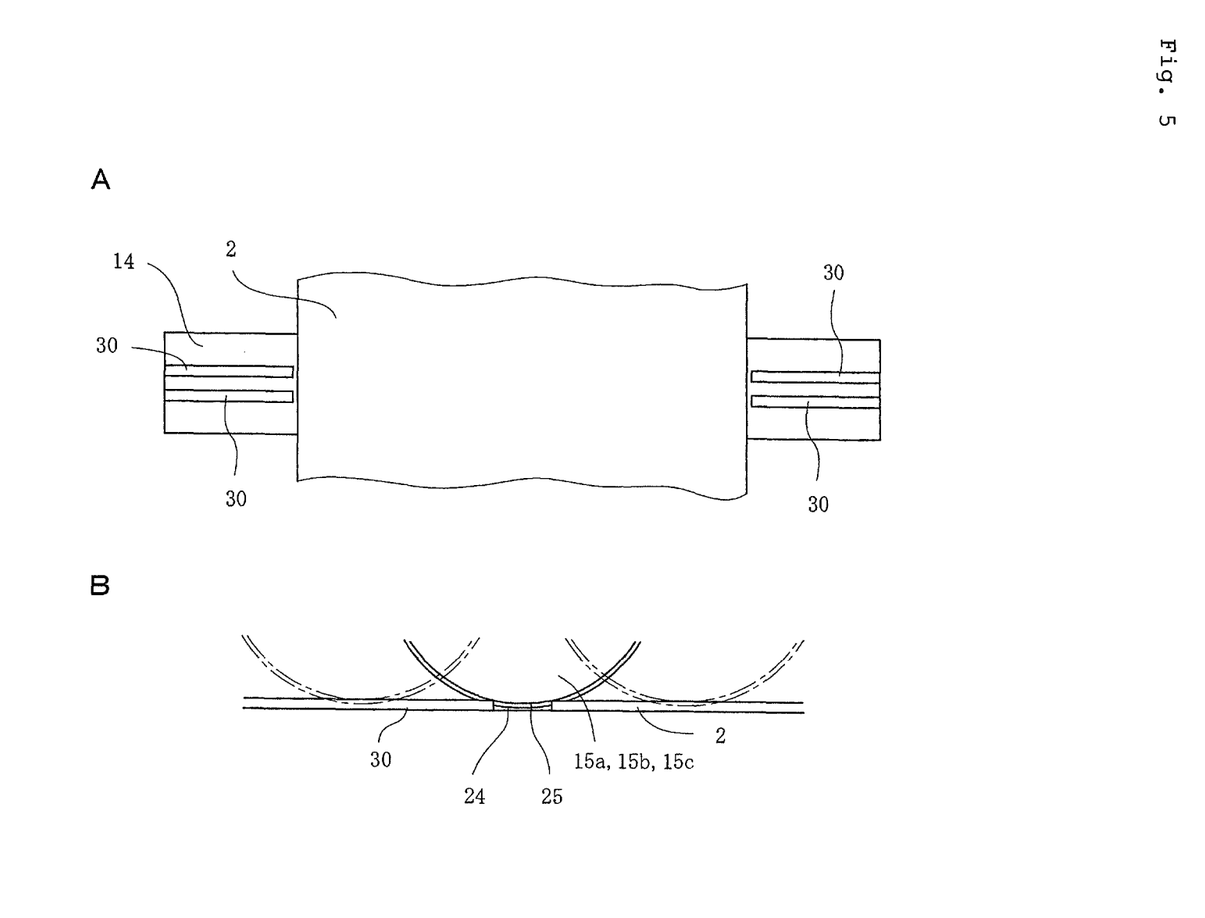
FIG. 5 is a plan view (A) and an elevational view (B) of another embodiment.

The rollers 15a, 15b and 15c are pressed against the base 14 at the first and second positions, as described above. In this connection, a plastic tape or steel plate 30 may be applied to the base 14 so that the outer surface 25 can be engaged with the plastic tape or steel plate 30 on the opposite sides of the peripheral edge 24, the plastic tape or steel plate 30 being interposed between the rollers 15a, 15b and 15c and the base 14, when the rollers 15a, 15b and 15c are pressed against the base 14, as shown in FIG. 5. The plastic tape or steel plate 30 has a thickness of about 200 μm. In this case, the peripheral edge 24 and the base 14 are kept from being engaged with each other directly, resulting in no abrasion or damage.

Figure 6:
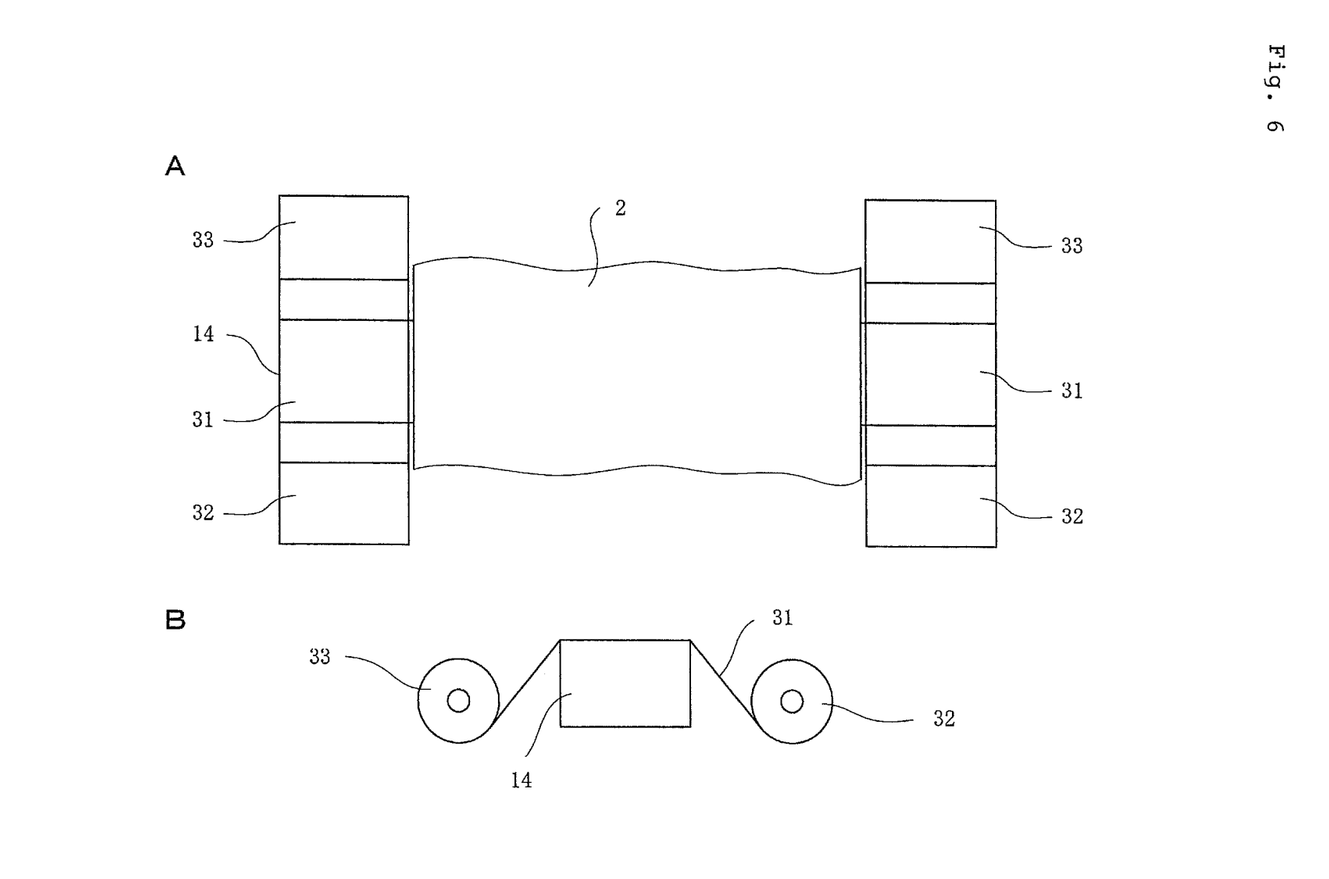
FIG. 6 is a plan view (A) and a side view (B) of another embodiment.

The base 14 may be covered with a plastic film 31 so that the plastic film 31 can be interposed between the rollers 15a, 15b and 15c and the base 14, as shown in FIG. 6. The plastic film 31 may be taken up onto a roll 32 after being used to be supplied from a roll 33 and directed to the base 14 at one of the first and second positions when the rollers 15a, 15b and 15c stand by at the other position.

Figure 7:
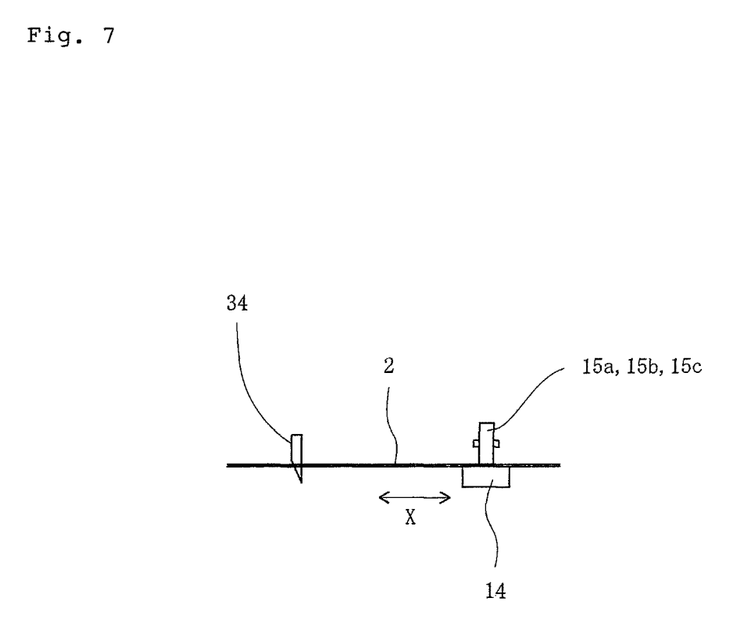
FIG. 7 is a side view of another embodiment.

In the embodiment of FIG. 5, the plastic film or steel plate 30 should be disposed close to the plastic film 2 so that the peripheral edge 24 and the base 14 can be kept from being engaged with each other directly. A slitter 34 should therefore be disposed upstream of the rollers 15a, 15b and 15c in the direction of feeding the plastic film 2 to slit and separate the deckle edges from the plastic film 2, as shown FIG. 7. In this case, the plastic film 2 is kept from being meandered to be engaged with the plastic tape or steel plate 30. The same is true of the embodiment of FIG. 6.

Figure 8:
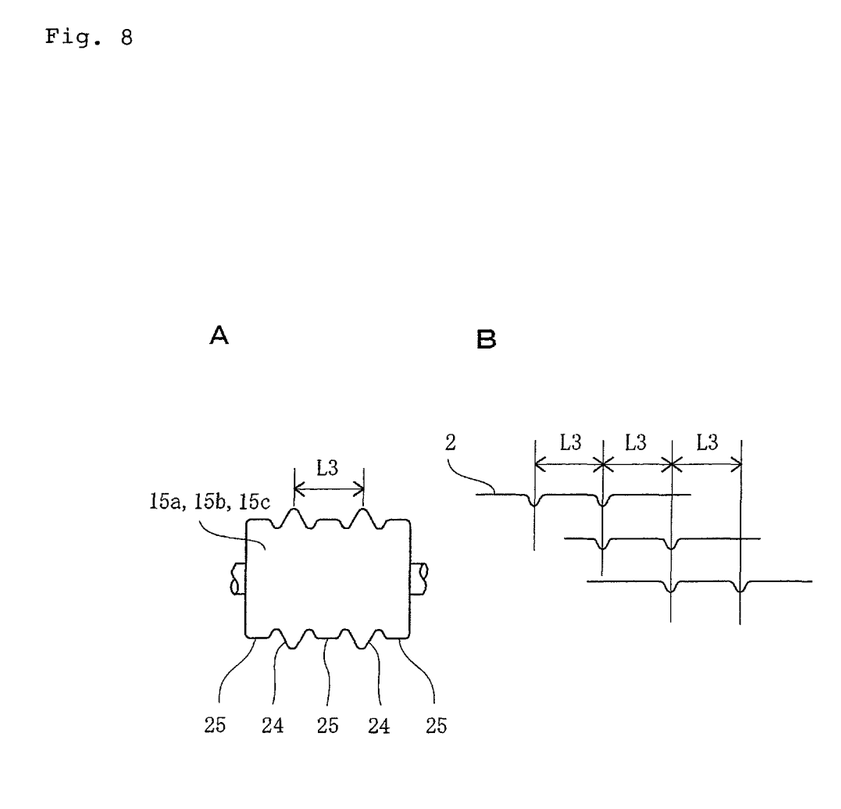
FIG. 8 is a side view (A) and an explanatory view (B) of another embodiment.

Each of the rollers 15a, 15b and 15c may include two peripheral edges 24 spaced from each other at a distance L3 axially of the rollers 15a, 15b and 15c, as shown in FIG. 8. The distance L3 is of about 1.5 mm. In this case, two peripheral edges 24 bite into the plastic film 2 so that two grooves can be formed in the plastic film 2, when one of the rollers 15a, 15b and 15c is pushed and moved downwardly. The grooves are spaced from each other at the distance L3. The apparatus may be arranged that four peripheral edges 24 bite into the plastic film 2, two of the peripheral edges 24 being disposed at the same position axially of the rollers 15a, 15b and 15c, so that three grooves can be formed in the plastic film 2 to be spaced from each other at the distance L3, when two of the rollers 15a, 15b and 15c are pushed and moved downwardly. In addition, the apparatus may be arranged that six peripheral edges 24 bite into the plastic film 2, two of the peripheral edges 24 being disposed at the same position axially of the rollers 15a, 15b and 15c, another two of the peripheral edges 24 being disposed at the same position axially of the rollers 15a, 15b and 15c, so that four grooves can be formed in the plastic film 2 to be spaced from each other at the distance L3, when all the rollers 15a, 15b and 15c are pushed and moved downwardly.

In the embodiment of FIG. 8, the apparatus may be arranged that four peripheral edges 24 bite into the plastic film 2 at positions different from each other axially of the rollers 15a, 15b and 15c so that four grooves can be formed in the plastic film 2 to be spaced from each other at a distance, when two of the rollers are pushed and moved downwardly. The apparatus may be arranged that six peripheral edges 24 bite into the plastic film 2 at positions different from each other axially of the rollers 15a, 15b and 15c so that six grooves can be formed in the plastic film 2 to be spaced from each other at a distance, when all the rollers 15a, 15b and 15c are pushed and moved downwardly.

Two rollers may be arranged in a line widthwise of the plastic film 2 or in the direction Y. Four or more rollers may be arranged in a line. Plural rollers may be arranged in plural lines.

It should be understood that in the embodiment, the carriage 18, the linear cylinders 17a, 17b and 17c and the rollers 15a, 15b and 15c are moved by the first drive means so that at least one of the rollers can be rolled along the plastic film 2 when the rollers 15a, 15b and 15c are moved. In this connection, at least one of the rollers may be rotated by the first drive means to be rolled along the plastic film 2 when being pressed against the plastic film 2 whereby the rollers 15a, 15b and 15c can be moved.

In addition, in the embodiment, the plastic films 2 and 3 are heat sealed and cut to successively make plastic bags, as described above. In general, the plastic films 2 and 3 are heat sealed with each other longitudinally and widthwise thereof. In this connection, the plastic film 2 and 3 should be heat sealed with each other widthwise thereof at positions corresponding to the stretched portions. The plastic films 2 and 3 are then cut by the cutter so that the stretched portions can be cut off and removed. It is also practicable that the grooves are formed in the plastic film 2 to have depths and widths which are small to retain the strength of plastic film 2, when stretching the plastic film 2. In this case, the stretched portions have not always to be removed.

What is claimed is:

1. An apparatus for stretching a plastic film longitudinally thereof, the apparatus comprising:
    a base;
    a plastic film feeder by which the plastic film is directed onto the base and fed longitudinally thereof and intermittently;
    a plurality of rollers supported on a shaft for rotation thereabout, the shaft extending longitudinally of the plastic film, the rollers being opposed to the base;
    a first drive by which the rollers are moved widthwise of the plastic film when the plastic film is stopped temporarily; and
    a second drive working on the rollers individually so that at least one of the rollers can be pressed against the plastic film on the base when the plastic film is stopped temporarily, the at least one of the rollers being rolled along the plastic film to stretch the plastic film.

2. The apparatus as set forth in claim 1 wherein the rollers are moved by the first drive so that the at least one of the rollers can be rolled along the plastic film when the rollers are moved.

3. The apparatus as set forth in claim 1 wherein the at least one of the rollers is rotated by the first drive to be rolled along the plastic film when being pressed against the plastic film whereby the rollers can be moved widthwise of the plastic film.

4. The apparatus as set forth in claim 1 wherein the rollers are arranged widthwise of the plastic film.

5. The apparatus as set forth in claim 1 wherein the second drive comprises a plurality of linear actuators supported on a carriage, the linear actuators being connected to the rollers respectively, the carriage being moved along a beam extending widthwise of the plastic film, the first drive being connected to the carriage so that the carriage, the linear actuators and the rollers can be moved by the first drive, the linear actuators working on the rollers individually so that the at least one of the rollers can be pressed against the plastic film.

6. The apparatus as set forth in claim 1 wherein first and second positions are predetermined on opposite sides of the plastic film widthwise thereof, the rollers standing by at the first position to be moved to the second position through the plastic film when the plastic film is stopped temporarily, the rollers then standing by at the second position to be moved to the first position through the plastic film when the plastic film is stopped temporarily.

7. The apparatus as set forth in claim 6 wherein the at least one of the rollers is pressed against the base to stand by as the at least one of the rollers is at the first or second position, the at least one of the rollers then stepping on the plastic film to be pressed against the plastic film when the rollers are moved.

8. The apparatus as set forth in claim 6 wherein the rollers are spaced from the base to stand by as the rollers are at the first or second position, the at least one of the rollers being then pressed against the plastic film when reaching the plastic film in accordance with the movement of rollers.

9. The apparatus as set forth in claim 1 wherein each of the rollers includes a tapered peripheral edge which bites into the plastic film to stretch the plastic film when the at least one of the rollers is pressed against the plastic film and rolled along the plastic film.

10. The apparatus as set forth in claim 9 wherein the peripheral edge has an arced section of a radius.

11. The apparatus as set forth in claim 10 wherein the rollers include the peripheral edges having the radii different from roller to roller.

12. The apparatus as set forth in claim 9 wherein each of the rollers includes a cylindrical outer surface and an annular protrusion extending beyond and protruding from the outer surface, the peripheral edge being formed by the annular protrusion, the outer surface being engaged with the plastic film on opposite sides of the annular protrusion axially of the roller when the roller is pressed against the plastic film.

13. The apparatus as set forth in claim 9 wherein the rollers include the peripheral edges biting into the plastic film at amounts different from roller to roller.

14. The apparatus as set forth in claim 9 wherein the rollers include the peripheral edges disposed at positions different from roller to roller axially of the rollers.

* * * * *